April 1, 1958 E. PELL ET AL 2,829,325
PROTECTIVE SYSTEM FOR SYNCHRONOUS MOTOR CONTROLLERS
Filed Nov. 10, 1954
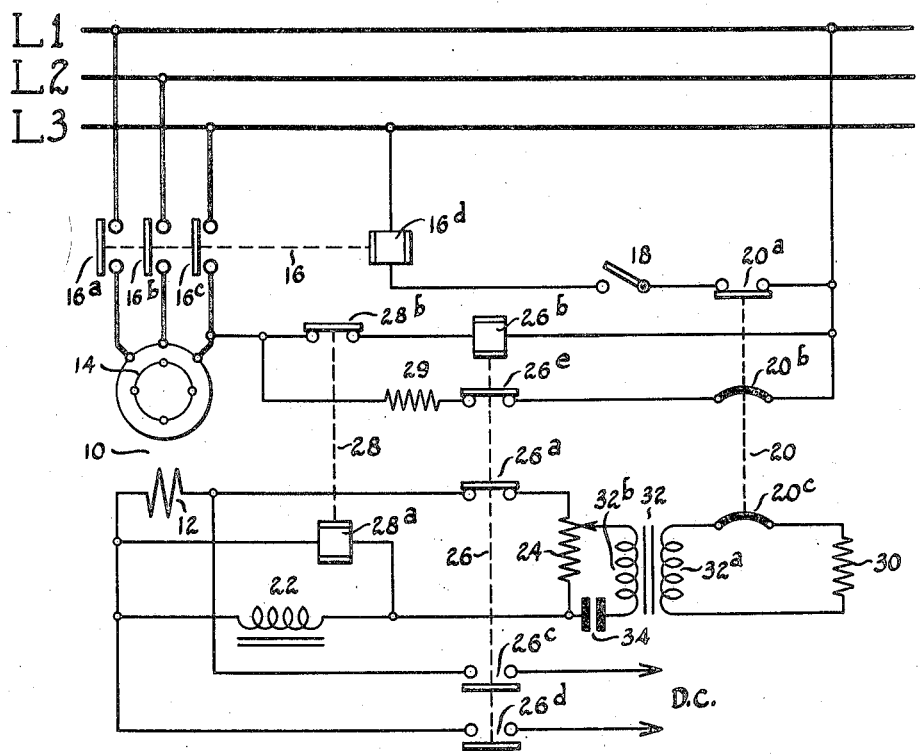
Inventors.
Eric Pell
Blakeslee D. Wheeler
By Grover A. Frater
Attorney

2,829,325

PROTECTIVE SYSTEM FOR SYNCHRONOUS MOTOR CONTROLLERS

Eric Pell and Blakeslee G. Wheeler, Wauwatosa, Wis., assignors to Cutler-Hammer, Inc., Milwaukee, Wis., a corporation of Delaware Application November 10, 1954, Serial No. 468,043

3 Claims. (Cl. 318—170)

This invention relates to protective systems for synchronous motor controllers.

An object of the invention is to provide improved systems for protecting synchronous motors against damage in the event of a failure of the motor to run when energized.

Another object is to provide systems affording to synchronous motors protection against failure to start and failure to reach synchronous speed.

A more specific object is to provide a protective system of the aforedescribed character in which the time required to detect blocked condition of the motor and to disconnect the motor from the source is very short while the time allowed for the motor to pull into synchronism is the maximum safe time.

Various other objects and advantages of the invention will hereinafter appear.

The accompanying diagram of a protective system has been simplified for the sake of clarity. It illustrates one embodiment of the invention. It is to be understood that certain modifications are possible to be made in the embodiment illustrated and that other embodiments are possible without departing from the spirit of the invention or the scope of the appended claims.

In the drawing the numermal 10 represents a synchronous electric motor having a field winding 12, a starting winding 14 and primary windings for energization from lines L1, L2 and L3 when the contactors $16^a$, $16^b$ and $16^c$ of main contactor 16 are closed.

The energizing circuit for contactor 16 is shown in simplified form for the sake of clarity. It comprises coil $16^d$ of contactor 16, a start-stop switch 18 and normally closed contacts $20^a$ of a thermal relay 20.

During acceleration of the motor 10 its field winding 12 is connected in a loop circuit with a reactor 22, a field resistor 24 and the normally closed contacts $26^a$ of a relay 26. When the motor approaches synchronous speed the coil $26^b$ of relay 26 is energized. Contacts $26^a$ then open to interrupt the loop circuit and normally open contacts $26^c$ and $26^d$ close to connect field winding 12 to a unidirectional power source.

Energization of coil $26^b$ is controlled by a contactor 28. The coil $28^a$ of this contactor is connected in shunt with reactor 22. Its contacts $28^b$ are connected in series circuit with coil $26^b$ and main contacts 16c across supply lines L1 and L3.

The thermal relay 20 has two thermal elements $20^b$ and $20^c$ either of which can open contacts $20^a$ to interrupt the energizing circuit for main contactor 16. Element $20^b$ is connected in series circuit with normally closed contacts $26^e$ of contactor 26, a limiting resistor 29 and main contacts 16c across lines L1 and L3. The other element $20^c$ is connected in loop circuit with a resistor 30 and the secondary winding $32^a$ of a transformer 32. Primary winding $32^b$ is connected in series with a capacitor 34 across a selected portion of the field resistor 24. If preferred, the thermal relay 20 may be replaced with two thermal relays having single operating elements.

In normal operation of the system, upon closure of switch 18, coil $16^d$ will be energized from lines L1 and L3 through switch 18 and contacts $20^a$. Main contactors $16^a$, $16^b$ and $16^c$ close to energize the motor. The latter accelerates as an induction motor and induces, in field winding 12, a voltage which diminishes in frequency as the motor speed approaches synchronous speed. At low motor speeds the high frequency of this induced voltage is sufficiently great so that most of the current, which is caused to flow in the loop field circuit, flows through coil $28^a$ rather than through reactor 22. This current is sufficient to cause contacts $28^b$ to open and interrupt current flow to coil $26^b$ before said coil can act to actuate its contacts. Accordingly contacts $26^a$ and the loop circuit remain closed until, when the motor almost reaches synchronous speed and the frequency of the induced voltage and the impedance of reactor 22 is low, relay 28 is effectively deenergized and contacts $28^b$ are permitted to close. Upon closure of these contacts contactor 26 is actuated to open the loop field circuit and to close its contacts $26^c$ and $26^d$ whereby the field winding is connected to the unidirectional power source.

The motor requires protection against two eventualities. The starting windings will become over-heated and burn up: if the motor is blocked against starting; or if the acceleration period is prolonged so that the motor does not pull into synchronism in a relatively short time.

If the motor is blocked when the main contacts close, the voltage induced in the field winding will be of high frequency and the induced current will flow in coil $28^a$ rather than through choke 22. Contacts $28^b$ will open to prevent energization of coil $26^b$ and actuation of contacts $26^a$. A portion of the high frequency alternating voltage drop across resistor 24 is applied through capacitor 34 to transformer winding $32^b$. The induced current in the secondary winding $32^a$ heats element $20^c$ and the latter operates to open contacts $20^a$ to deenergize the main contactor and disconnect motor 10 from the supply lines.

If the motor accelerates but for some reason does not pull into synchronism, relays 28 and 26 would remain energized and deenergized, respectively. Contacts $26^e$ would remain closed and current flow through element $20^b$ would continue. After a given period determined by its characteristics, element $20^b$ would become heated sufficiently to open contacts $20^a$ to deenergize the motor 10.

Protection of the motor is complicated by the fact that if the motor is blocked, the starting winding will burn up in less than the normal accelerating time of the motor. However, since the means to protect against failure to pull into synchronism must not act until after the normal acceleration period has expired, the means to protect against a blocked condition must act in much less than the normal accelerating period. Moreover, in the case of a blocked motor it is desirable to remove the motor from the line just as rapidly as possible. This means that the ratio of the time to disconnect the motor in case of failure to pull in to the time to disconnect a blocked motor preferably is large.

It also means that element $20^c$ must be very sensitive and/or must be subjected to large currents under blocked conditions. But if the sensitive element is subjected to too high a current during normal acceleration, the contacts $20^a$ may open prematurely before the motor is fully accelerated.

In accordance with the invention, the circuit of element $20^c$ is arranged so that a large current flows in said element under blocked motor conditions when the frequency of the voltage induced in the field winding equals supply frequency but diminishes very rapidly as the frequency of the field winding induced voltage is reduced.

To achieve this, transformer 32 is provided with an air gap to reduce saturation effects which would tend to diminish the difference in secondary current resultant of a change in frequency of the primary current. The fact that the transformer is an inductive device in which secondary voltage is a function of the primary circuit excitation frequency also aids in effecting large increments of change in the current in element 20c as excitation frequency changes. A third influence having similar effect is provided by the capacitor 34 which will pass high frequencies and will block low frequencies. Because of the action of the capacitor 34 the impedance of the network is infinite at synchronous speed of the motor.

Either the transformer 32 or the capacitor 34 could be omitted from the circuit and the current in element 20c would decrease as motor speed increased. But the combined effect of these components greatly exceeds their individual effects when the values of the components and resistor 30 are selected so that the circuit is series resonant at a frequency somewhat higher than the frequency of the supply source, and so that the circuit Q is relatively high.

The transformer 32 may be replaced by a swinging choke if desired. However, the transformer with an air gap is preferred.

We claim:

1. In combination, a synchronous motor having a main energizing circuit and a field winding, means in circuit with said field winding and responsive to failure of the motor to run when energized to interrupt said energizing circuit, said means comprising a current responsive element and impedance means interconnecting the field winding and the current responsive element, said impedance means comprising a capacitive and an inductive impedor serially connected across at least a portion of said field winding, and said current responsive element comprising a thermally operated switch having a thermal element connected in parallel with the inductive impedor.

2. The combination defined in claim 1 including means responsive to a given speed of the motor to connect said field winding for normal synchronous operation of the motor, and means acting to interrupt energization of the motor at a predetermined time following energization of the motor unless said field winding has previously been connected for normal operation of the motor.

3. The combination defined in claim 1 including means responsive to a given speed of the motor to connect said field winding for normal synchronous operation of the motor, and means acting to interrupt energization of the motor at a predetermined time following energization of the motor unless said field winding has previously been connected for normal operation of the motor.

References Cited in the file of this patent
UNITED STATES PATENTS

| | | |
|---|---|---|
| 2,252,444 | Stimson | Aug. 12, 1941 |
| 2,304,542 | Chambers | Dec. 8, 1942 |
| 2,323,485 | Pell | July 6, 1943 |
| 2,428,539 | Armstrong | Oct. 7, 1947 |